United States Patent [19]

Meier

[11] 3,886,430

[45] May 27, 1975

[54] PHASE AND FREQUENCY SYNCHRONIZING CIRCUIT

[75] Inventor: Udo H. Meier, Lucerne, Switzerland

[73] Assignee: Reliance Electric Company, Cleveland, Ohio

[22] Filed: Dec. 6, 1973

[21] Appl. No.: 422,301

[52] U.S. Cl. .................. 321/9 A; 307/295; 318/231

[51] Int. Cl. ............................................ H02m 1/08

[58] Field of Search ........ 321/5, 9 A; 318/227, 230, 318/231; 331/20; 307/231, 295

[56] References Cited

UNITED STATES PATENTS

| | | | |
|---|---|---|---|
| 2,463,685 | 3/1949 | Fredendall et al. | 331/20 |
| 2,521,058 | 9/1950 | Goldberg | 331/27 |
| 3,249,886 | 5/1966 | Anderson et al. | 331/18 |
| 3,569,805 | 3/1971 | Hammond | 321/9 A |
| 3,611,086 | 10/1971 | Mokrytzki | 321/9 A |
| 3,614,590 | 10/1971 | Kernick | 321/9 A |
| 3,694,718 | 9/1972 | Graf et al. | 321/9 A |

*Primary Examiner*—William H. Beha, Jr.
*Attorney, Agent, or Firm*—Woodling, Krost, Granger & Rust

[57] ABSTRACT

An inverter apparatus is disclosed for synchronizing a carrier wave form to a reference wave form to have a given frequency relation for controlling thyristor means. The carrier and reference frequencies are independently generated by a carrier generator and a reference generator to have a given frequency relationship. A detector determines the frequency difference of the carrier wave form from the given frequency relationship. An integrator interconnects the detector and carrier generator to modify the carrier frequency for resynchronization when the carrier wave form is leading or lagging the reference wave form at the given frequency relationship and for modifying the carrier phase when the carrier wave form is lagging the reference wave form at the given frequency relationship. The phase modification may include modifying the slope of the carrier wave form to contract a cycle thereof to phase synchronize the carrier with the reference wave form.

12 Claims, 17 Drawing Figures

Fig. I

PHASE AND FREQUENCY SYNCHRONIZING CIRCUIT

This application discloses subject matter contained in the co-pending applications, Ser. Nos. 422,302 and 422,303 both filed Dec. 6, 1973.

BACKGROUND OF THE INVENTION

This invention relates to synchronizing a plurality of wave forms and more particularly to synchronizing a reference and a carrier wave form for modulation control of thyristor means.

In controlling thyristor means for inverters, choppers, and the like, it is desirable to be able to modulate a reference wave form with a carrier wave form to vary the effective power to a load. When two wave forms are used to control thyristor means, it is desirable to keep the wave forms synchronized to avoid unwanted harmonics and difficulties encountered by minimum pulse width commutations. The prior art has solved these difficulties by establishing a master generator which frequency is digitally divided to obtain a reference frequency to control the fundamental frequency of the load. Carrier frequency is established to be a slave of one of the various digitally divided frequencies between the master generator and the reference generator to provide various carrier to reference frequency ratios. Prior art circuits have changed the carrier to reference frequency ratio by changing the particular divider output between the master generator and the reference generator. Since the carrier frequency was always a slave of a divided master generator frequency, the circuit insured proper synchronization between the reference and the carrier wave form. When a digitally controlled carrier generator such as described above was used in an inverter circuit, the disadvantages are immediately realized during low-speed operation. At low reference frequencies near zero hertz, the carrier frequency must be high enough to eliminate low order harmonics; but since the carrier frequency is a slave of the reference frequency such a constraint could not be partically obtained with digitally controlled generators. Consequently, circuits incorporating a digitally controlled carrier generator possessed a dead band around zero reference frequency. When these control circuits were applied to provide a variable speed AC motor, the motor could not operate smoothly down to and through zero speed.

Another disadvantage of the digitally controlled carrier wave form generators is the limited number of ratios available between the carrier frequency and the reference frequency. The number of ratios was determined by the number of digital dividers between the master generator frequency and the reference frequency. The limited number of ratios was not significant at high reference frequencies but as the reference frequency decreased to low speed operation, the limited number of ratios available resulted in higher harmonics and lower efficiency. Designers had to compromise between the complexity of adding additional digital dividers and the minimum number of ratios required to provide efficient operation in the low and intermediate reference frequency range.

Therefore, the inventor has realized that ideally an inverter control circuit should have a free-running carrier wave form at or about zero reference frequency to minimize this harm and thereby eliminating the dead band about zero reference frequency. The free-running carrier wave form would allow the control circuit to reverse directions through zero reference frequency. Ideally, an inverter control circuit should provide a great number of carrier to reference frequency ratios to provide low harmonic content within the intermediate frequency range of the reference wave form. An analog device providing a large number of synchronized carrier frequency to reference frequency ratios would be desirable for such an intermediate range operation. Ideally, an inverter control circuit should have a digitally controlled carrier generator for high reference frequencies which require only a limited number of ratios.

Therefore an object of this invention is to provide an apparatus wherein a reference wave form and a carrier wave form frequency are independently generated.

Another object of this invention is to provide a free-running carrier wave form at zero reference frequency.

Another object of this invention is to provide proper frequency synchronization between a reference and a carrier wave form for intermediate and high reference frequencies.

Another object of this invention is to provide phase synchronization for intermediate and high reference frequencies.

Another object of this invention is to provide a substantially high number of integral ratios of a carrier frequency to intermediate reference frequencies.

Another object of this invention is to provide discrete ratios of carrier to reference frquency at high reference frequencies.

Another object of this invention is to provide an apparatus which has a wide frequency and voltage range with minimum harmonic loss.

Another object of this invention is to provide an apparatus for controlling through zero reference frequency for four quadrant operation.

Another object of this invention is to provide an apparatus capable of 24, 12, and six-step reference wave form operation.

SUMMARY OF THE INVENTION

The invention may be incorporated in an apparatus for synchronizing a first wave form and a second wave form to have a given frequency relation, comprising in combination, a circuit for establishing the first wave form, a circuit for establishing the second wave form, detector means for determining a difference from the given frequency relation of the first and second wave forms, and means connecting said detector means for synchronizing the first and second wave forms at the given frequency relation.

Other objects and a fuller understanding of the invention may be had by referring to the following description and claims, taken in conjunction with the accompanying drawings.

DESCRIPTION OF THE PREFERRED EMBODIMENT

Figure 1:
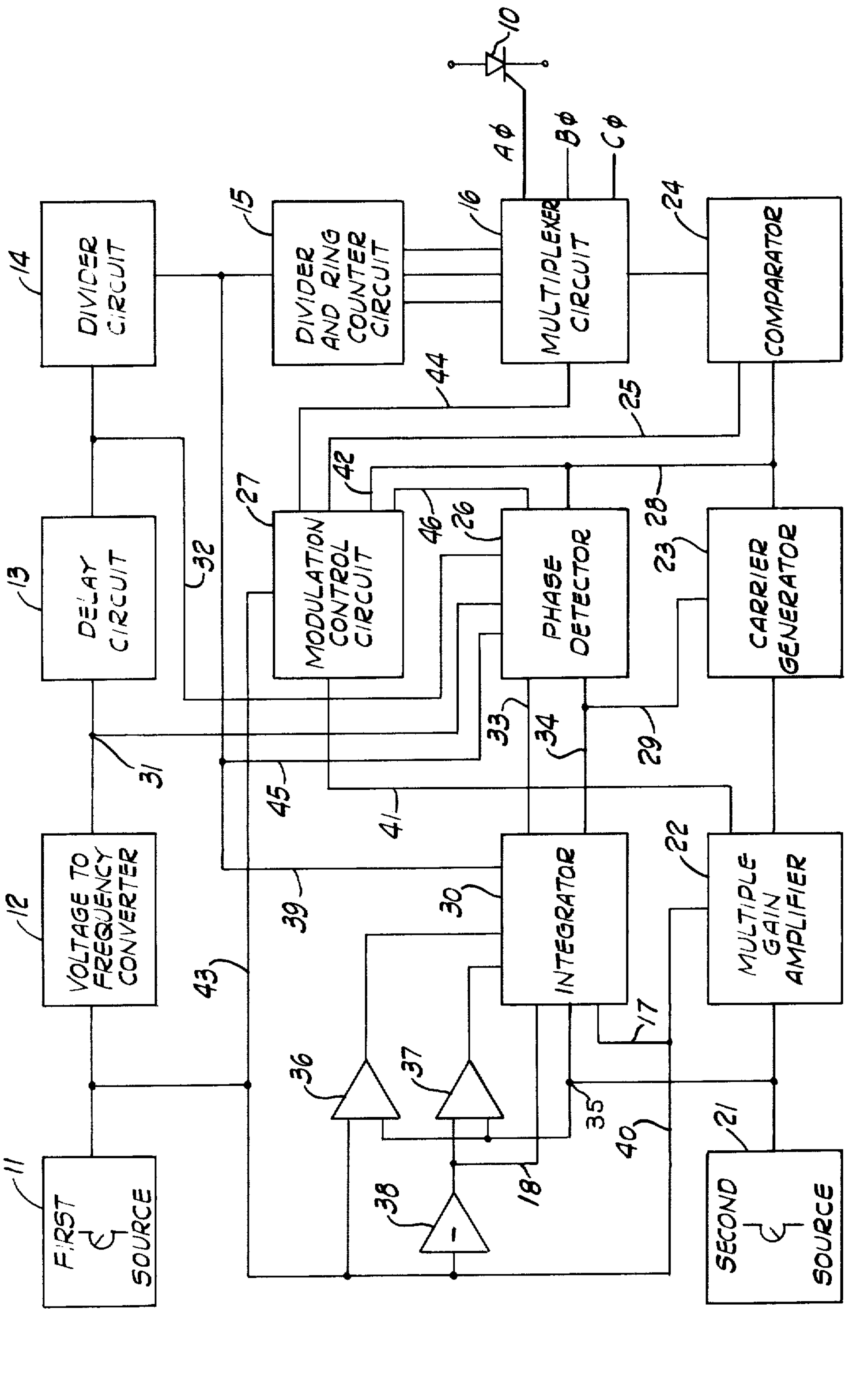
FIG. 1 is the preferred embodiment showing a wave form control circuit.

FIG. 1 is the preferred embodiment illustrating an inverter for generating a reference and a carrier wave form to control thyristor means 10. A first source 11 for establishing a first variable level is connected to a voltage to frequency converter 12 for establishing an alternating voltage in accordance with the level of the first source 11. The output of the voltage to frequency converter 12 is applied to a delay circuit 13 which generates a signal phase delayed in time relative to the output of the voltage to frequency converter 12. The output of the delay circuit 13 is connected to a divider circuit 14 wherein the output of the delay circuit is divided by four. The output of the divider circuit 14 is applied to a divider and ring counter circuit 15 which divides the output of divider circuit 14 by 6 and establishes a three phase reference wave form in accordance with the divided frequency. The three phases of the reference wave form are connected to a multiplexer circuit 16 for modulating the reference wave form with a carrier wave form to establish phase outputs A, B, and C to control the thyristor means 10. The blocks designated 11–15 provide a variable frequency reference wave form which is delayed in time relative to the output of the voltage to frequency converter 12.

The carrier wave form for modulating the reference wave is established by an independent circuit. A second source 21 for establishing a second source level is connected to a multiple gain amplifier 22. The output of the multiple gain amplifier 22 is connected to a carrier generator 23 for generating the carrier wave form in accordance with the second source level and the gain of the multiple gain amplifier 22. The output of the carrier generator 23 is applied to a comparator 24 which compares the carrier wave form with a level on a connector 25 generated by a modulation control circuit 27 to control the amount of modulation of the carrier wave form to be applied to the multiplexer 16 to modulate the reference wave form.

The carrier and reference wave forms are separately generated and consequently the apparatus must include some provision to synchronize the reference and carrier wave forms to eliminate undesired harmonics. The carrier wave form is applied to a phase detector 26 by connector 28, whereas the outputs of the voltage to frequency converter 12 and the delay circuit 13 are applied to the phase detector 26 by connectors 31 and 32 respectively. The phase detector 26 determines the difference in frequency relation between the output of the delay circuit 13 and the carrier wave form and provides an input to an integrator 30 which provides an integrator output 35 which is proportional to the difference in frequency relation of the carrier wave form and the delayed wave form. If the carrier wave form is leading the reference wave form, then a phase detector output 33 decreases the voltage on integrator 30 to provide a decrease in integrator output 35. The decreased integrator output 35 is applied to the input of the multiple gain amplifier 22 to reduce the frequency of the carrier generator 23. Since the output of phase detector 26 is stored in the integrator 30, and integrator output 35 or correction signal is applied to the carrier generator 23 when there is a zero phase detector output. The integrator allows zero phase error synchronization between reference wave form and the carrier wave form of the carrier generator 23. If the carrier wave form is lagging the delayed wave form, then a phase detector output 34 increases the voltage on the integrator 30 to provide an increase in integrator output 35. The increased integrator output 35 increases the frequency of the carrier generator 23. The phase detector output 34 of a lagging carrier is also applied via connector 29 to the carrier generator 23 to phase synchronize the carrier wave form with the reference wave form.

The first source level 11 controls the frequency of the reference wave form which controls the frequency of the outputs A, B, and C of the inverter. If the output of thyristor 10 is to a motor, then this reference frequency output controls the speed of the motor. The second source level 21 is established at a level to provide a nominal carrier frequency such that for a given frequency of the reference wave form and a zero integrator output 35, the nominal carrier frequency is an integral ratio of the reference frequency. As the reference frequency is increased by an increase of the first source 11, the phase detector 26 will produce an output 34 to the integrator 30 to increase the frequency of the carrier generator 23 from the nominal carrier frequency to maintain the integral ratio between the carrier and the reference frequencies. Conversely, if the reference frequency is decreased by a decrease in the first source 11, the phase detector 26 will produce an output 33 to the integrator 30 to decrease the carrier frequency. The integrator output 35 is limited by comparators 36 and 37. The comparator 36 compares the integrator output 35 with the first source level 11 whereas the comparator 37 compares the integrator output 35 with the negative of the first source level 11 through an inverting amplifier 38. When the integrator output 35 reaches a boundary established by the positive and negative values of the first source level, then one of the comparators 36 and 37 will reset the integrator 30 to return the carrier generator to a nominal carrier frequency determined by the second source 21 and the gain of amplifier 22. The boundary is so arranged that a second integral ratio of the carrier to the reference frequency is established each time the integrator is reset. The integrator 30 is charged in accordance with the positive and negative values of the first source level 11 through connectors 17 and 18 and in accordance with the phase detector outputs 33 and 34. The integrator 30 is connected to the divider circuit 14 by connector 39 to insure that the integrator 30 is reset only at the proper phase relative to the reference wave form.

First control means including the second source 21 establishes the carrier wave form at a nominal frequency to provide high ratios of the carrier to reference frequency at low reference frequencies. The nominal frequency provides a substantially free-running carrier wave form when the reference frequency is substantially zero.

Second control means, comprising the phase detector 26, integrator 30, comparators 36 and 37 and inverting amplifier 38, provides means for varying the carrier frequency in accordance with changes in the reference frequency to maintain the first intermediate integral ratio. The second control means re-establishes the nominal frequency determined by the second source 21 by resetting the integrator 30 when the variation of the carrier frequency reaches a predetermined boundary. When the nominal frequency is reestablished, a second intermediate integral ratio exists providing a substantially infinite number of integral ratios for intermediate reference frequencies.

Third control means includes the multiple gain amplifier 22 and the first source 11 interconnected by connector 40. When the level of the first source 11 exceeds the level of the second source 21, which occurs at high end of this intermediate frequency range, multiple gain amplifier 22 decreases to synchronize the carrier frequency with the reference frequency in accordance with the gain of the multiple gain amplifier 22. The gain of the multiple gain amplifier 22 is determined by the modulation control circuit 27 through a connector 41. The modulation control circuit perceives the carrier wave form through a connector 42 and perceives the first source 11 through a connector 43 to determine the particular gain of the multiple gain amplifier 22. The modulation control circuit 27 determines the number of steps of the reference wave form, for example 24, 12 or six-step, through a connector 44 and provides the level through connector 25 to comparator 24 to control the amount of modulation of the carrier wave form to the reference wave form. The modulation control circuit 27 also determines through a connector 46 whether synchronization of the carrier and reference wave form is accomplished from the delay circuit through connector 32 or is accomplished through the delay and the divider circuit 14 through connector 45.

Wave Form Synchronization Circuit

Figure 2:
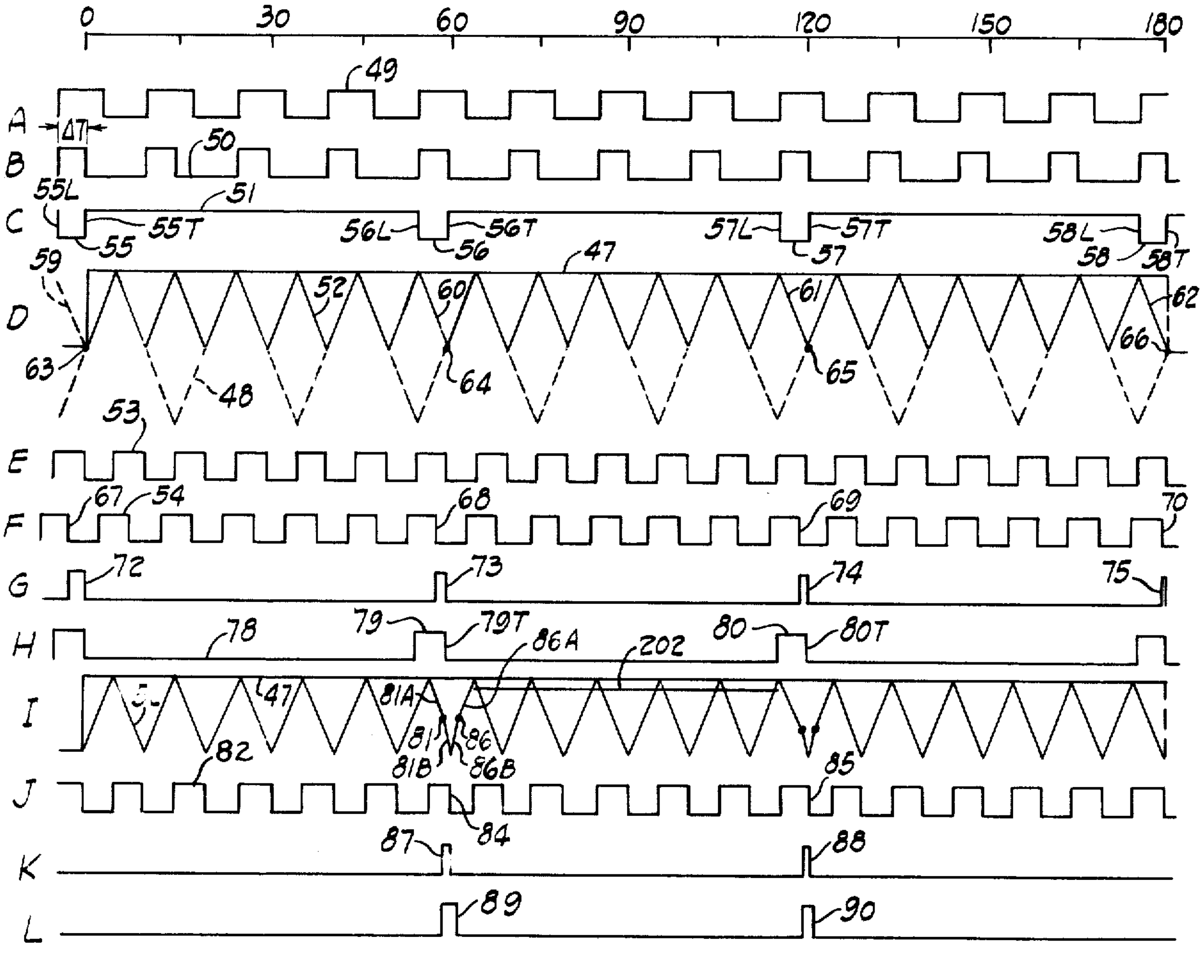
FIG. 2A–L show various wave forms generated in FIG. 1.

The phase synchronization of FIG. 1 may be studied in depth with reference to the wave forms of FIGS. 2A–L. The apparatus synchronizes the reference wave form 47 and the carrier wave form 48 in FIG. 2D to have a given frequency relation or a ratio and includes a circuit corresponding to blocks 11–15 for establishing the first or reference wave form 47 and a circuit including blocks 21–23 for establishing the second or carrier wave form 48. The first source 11 applies an input to the voltage to frequency converter 12 which generates a converter output 49 shown in FIG. 2A. The converter output 49 is applied to the delay circuit 13 which provides a delayed output 50, FIG. 2B, which is delayed by an amount ΔT from the converter output 49. The delayed output 50 is applied to the divider circuit 14 which provides a divider output 51, FIG. 2C. The phase detector 26 may resynchronize with the delayed output 50 through connector 32 every 15° or resynchronize with the divider output 51 through connector 45 every 60°. The selection of 15° or 60° re-synchronization is determined by the modulation control circuit 27 which signals the phase detector 26 through connector 46 and FIGS. 2E–2L illustrate a 60° resynchronization. FIG. 2D shows only the first 180° of the reference wave form 47 with the carrier wave form 48 being in phase. The carrier wave form 48 provides an integral ratio of 9:1 to the reference wave form 47. This may be considered a given frequency relation. The integral ratio is established by the relative levels of the first and second sources 11 and 21 and the gain of the multiple gain amplifier 22 with a zero integrator output 35. A rectified carrier wave form 52 has a frequency of twice the carrier wave form frequency and is used for comparison to eliminate problems resulting from DC shifts of the carrier wave form 48 relative to the reference wave form 47. The divider output 51 in FIG. 2C provides negative pulses 55–58 spaced every 60° for determining synchronizing points 63–66 of the rectified carrier wave form 52 which are synchronized with the reference wave form. With an integral ratio of 18:1, six rectified carrier wave forms will correspond to 60° of the reference wave form 47. Leading edges 55L–58L of the divider output 51 indicate to the phase detector 26 that negative slopes 59–62 of the rectified carrier wave form 52 are the final slopes prior to the synchronization points 63–66 which correspond to a 60° duration of the reference wave form 47. The delayed output 50 provides a period shown by the negative pulses 55–58 for determining the phase error of the rectified carrier wave form 52 relative to the reference wave form 47.

FIG. 2E shows a wave form 53 of the negative of the slope of the rectified carrier wave form 52. The negative rectified carrier slope 53 is a convenient form for comparison with the delayed output 50 or the divider output 51.

FIG. 2F shows a negative rectified carrier slope 54 of a carrier wave form which is leading relative to the reference wave form. A modification of the carrier frequency must be provided to resynchronize the carrier to the reference frequency to maintain the integral ratio of 18:1. The phase detector 26 is activated by trailing edges 67–70 of the leading wave form 54 and is deactivated by trailing edges 55T–58T of the divider output 51 to produce correcting pulses 72–75 shown in FIG. 2G. The correcting pulses 72–75 are proportional in duration to the phase difference between the carrier and the reference wave forms in the respective 60° interval for modifying the frequency of the carrier wave form to frequency resynchronize the carrier and reference wave forms. Correcting pulse 72 is applied to integrator 30 to provide an integrator output 35 to modify the input voltage to the multiple gain amplifier 22 to decrease the frequency of the carrier generator 23. In this example correction pulse 72 only partially corrected the frequency and additional correction pulses 73–75 are required to modify the frequency of the carrier generator to resynchronize the carrier wave form with the reference wave form. The duration of each successive correction pulse 73–75 is less than the previous correction pulse indicating a frequency correction of the carrier wave form to the given frequency relation.

FIG. 2H shows a negative divider output 78 which is the inverse of the divider output 51 of FIG. 2C.

FIG. 2I shows the reference wave form 47 with the rectified carrier wave form 52 being in phase at the beginning of the half-cycle of the reference wave form. However, at a trailing edge 79T of a synchronizing pulse 79, the rectified carrier wave form 52 is lagging relative to the reference wave form as shown by a point 81 which should be at a zero level. This could be caused, for example, by a slight increase of voltage of the first source 11 to obtain a slight increase of reference frequency and hence output motor speed.

FIG. 2J is the negative rectified carrier slope 82 which is used in conjunction with the negative divider output 78 to correct for carrier wave forms which lag the reference wave form. The phase detector 26 is activated by trailing edges 79T and 80T of pulses 79 and 80 and the phase detector 26 is deactivated by the trailing edges 84 and 85 of the negative rectified carrier slope 82 to provide correction pulses 87 and 88 shown in FIG. 2K. The pulses 89 and 90 are applied to the carrier generator 23 to modify the slope of the carrier wave form, for example, slope doubling, to phase resynchronize the carrier wave form to the reference wave form. Slope 81B following point 81 is increased in magnitude relative to slope 81A which is prior to point 81. Likewise slope 86B is greater in magnitude than slope 86A after point 86. The slope doubling process contracts one cycle of the carrier wave form to phase synchronize the carrier with the reference wave form. FIG. 2I shows that the carrier wave form again becomes lagging after correction between points 81 and 86 and is again corrected by the correction pulse 90 to be phase synchronized at the end of the half-cycle of the reference wave form. The lagging correction pulese 87 and 88 are smaller in duration relative to the leading correction pulses for a given phase error due to the slope doubling process.

Consequently, a circuit must be included to compensate for the slope doubling process to enable slope doubling to occur on both the positive and the negative slopes of the carrier wave form and to provide proper frequency correction. The compensation circuit as will be described in detail later, provides correction signals 89 and 90 shown in FIG. 2L to slope double and frequency compensate lagging carrier wave forms to phase and frequency synchronize the carrier wave formsto the reference wave form.

Synchronizing Circuit Having An Infinite Number of Ratios

The apparatus in FIG. 1 includes means for synchronizing the carrier wave form 48 with a first or reference wave form 47 to provide a substantially infinite number of integral ratios of the carrier to reference frequency comprising a first circuit including blocks 11–15 for establishing the variable frequency reference wave form and a second circuit including blocks 21–23 for establishing the carrier wave form at a nominal frequency. The first source 11 varies the frequency of the reference wave form 47 whereas the second source 21 is substantially fixed to provide a nominal carrier frequency which nominal carrier frequency establishes a first integral ratio of the nominal frequency to a given frequency of the reference wave form. The phase detector 26 and integrator 30 vary the frequency of the carrier generator from the nominal frequency in accordance with a change in frequency of the reference wave form to maintain the first integral ratio between the carrier frequency and the reference frequency. The integrator output 35 adds or subtracts from the level of the second source 21 to control the input to the multiple gain aplifier 22 and the carrier generator 23. When the carrier generator frequency varies from the nominal frequency by an amount to reach a predetermined boundary, the integrator 30 is reset by one of the comparators 36 and 37 to re-establish the nominal carrier frequency which is determined by the second source level 21. The boundary is selected to provide a second integral ratio retween the carrier and reference frequency at the reset of the integrator 30.

Figure 3:
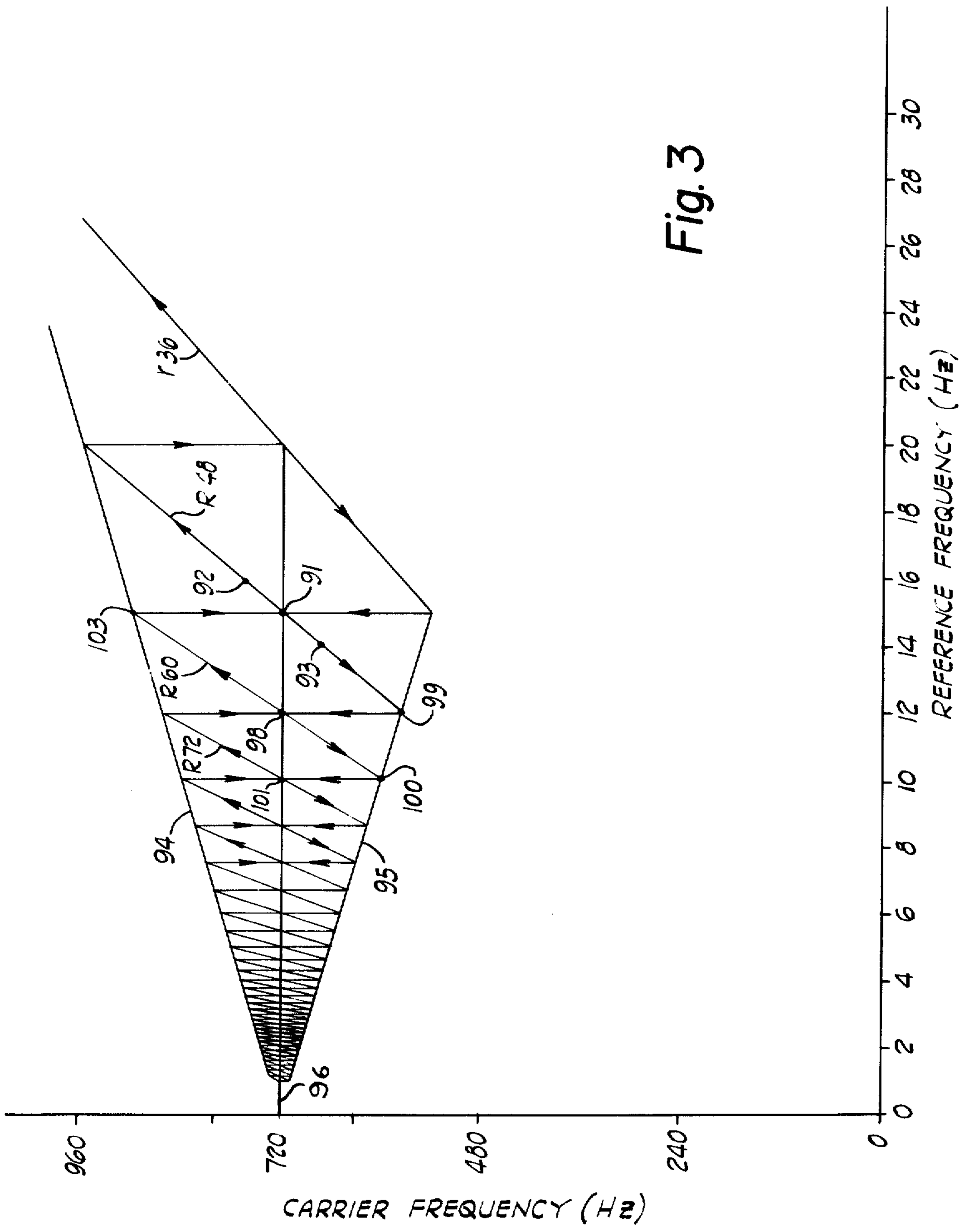
FIG. 3 is a graph of the carrier frequency relative to the reference frequency in the low and intermediate reference range.

FIG. 3 is a graph of the carrier frequency as a function of the reference frequency. The second source 21 establishes a nominal carrier frequency which is illustrated as 720 Hz. The nominal frequency provides an integral ratio of the carrier frequency relative to the reference frequency and, for example, is a ratio of 48 relative to a reference frequency of 15 Hz. at point 91 located on a constant ratio line B48. The ratio between the carrier and reference frequency will maintain at 48:1 and any drift from that ratio will be compensated by the previously described wave form synchronizing circuit. When the reference frequency is increased from 15 to 16 Hz., for example, the carrier frequency begins to lag the reference frequency which lag is detected by the phase detector 26 to provide an integrator output 35 to increase the carrier generator frequency from 720 to 768 Hz. to maintain the integral ratio of 48:1. The increase in reference frequency from 15 to 16 Hz. increases the carrier frequency from point 91 to point 92 along the constant ratio line R48. If the reference frequency is lowered from 15 to 14 Hz., the carrier frequency will begin to lead the reference frequency which lead is detected by the phase detector 26 to provide an integrator output 35 to reduce the carrier generator frequency from point 91 to point 93 along line R48 to maintain the integral ratio 48:1 The variation of frequency of the carrier generator 23 is limited in the positive and negative departures from the nominal frequency. An upper limit 94 is determined by the maximum allowable switching frequency of the thyristor means 10 whereas a lower limit 95 is determined by the lowest possible effect voltage per reference cycle with satisfactory harmonic content. The upper limit 94 is established by applying the first source 11 to comparator 36 whereas the lower limit 95 is established by applying the first source 11 through the inverting amplifier 38 to comparator 37. The integrator output 35 is applied to comparators 36 and 37 to provide a comparator output when the integrator output 35 is equal to one of the limits 94 and 95. Referring to FIG. 3, if the reference frequency is reduced from 15 to 12 Hz., then the integrator output 35 will equal the lower limit 95 at point 99 and comparator 37 will reset integrator 30 to re-establish the nominal frequency of 720 Hz. at point 98 which nominal frequency provides an integral ratio of 60:1 relative to the reference frequency of 12 Hz. If the reference frequency continues to decrease, the carrier frequency will reduce along the line of constant ratio R60 to a point 100 whereat the integrator output 35 will equal the lower limit 95 and comparator 37 will reset integrator 30 to reestablish the nominal frequency at point 101 which provides an integral ratio of 72:1 relative to the reference frequency of 10Hz. If the reference frequency is increased from 10 Hz., then the carrier frequency will tend to lag the reference frequency and the integrator 30 will increase the carrier frequency along line R72 to maintain the integral ratio of 72:1. When the reference frequency equals 12 Hz., the integrator output 35 will equal the upper limit 94 whereat comparator 36 resets the integrator 30 to re-establish the nominal frequency at point 98 which provides an integral ratio of 60:1 relative to the reference frequency of 12 Hz. A further increase of the reference frequency results in an increase along the line R60 to a point 103 at the upper limit 94 causing comparator 36 to reset the integrator 30 to establish the integral ratio of 48:1 of the carrier frequency relative to the reference frequency.

FIG. 3 illustrates that as the frequency of the reference wave form is reduced, a substantially infinite number of ratios may exist between the reference frequency and the carrier frequency. In the prior art circuits, only a discrete number of ratios were available between the carrier and reference wave forms and consequently the inverter did not operate at the highest efficiency. With a substantially infinite number of frequency ratios available between the carrier wave form and the reference wave form, the apparatus is highly efficient at low reference frequencies.

Multiple Control Wave Form Circuit

FIG. 1 illustrates an apparatus for multiple control of the carrier wave form relative to the reference wave form and comprises a circuit for establishing the variable frequency reference wave form including blocks 11–15. The carrier wave form is generated by the carrier generator 23 at a frequency determined by an input to the carrier generator 23.

First, second, and third control means control the carrier generator for low, intermediate and high reference frequencies, respectively. The second source 21 comprises the first control means for establishing the carrier wave form at a nominal frequency shown as 300 Hz. in FIG. 4 to provide high ratios of carrier frequency to reference frequency at low reference frequencies; for example, on or about zero hertz of the reference frequency, as shown by the area 96 in FIGS. 3 and 4. At low frequencies, the nominal frequency is essentially free-running to provide low harmonic content for transitions of the reference frequency through zero hertz. Consequently, the circuit can reverse the direction of an A.C. motor or provide smooth transitions between motor and generator action of an electrical machine. The free-running carrier enables the circuit to operate smoothly in all four quadrants, that is, motor and generator operation each in two directions, which has not been possible in pulse width modulation circuits of the prior art. The nominal frequency is selected to be a first intermediate integral ratio of a given intermediate reference frequency which is shown by point 91.

The second control means comprises the phase detector 26, integrator 30, and comparators 36 and 37 to vary the carrier frequency in accordance with intermediate reference frequencies, for example, above about ½ and below 10 Hz,. to maintain the first integral ratio along the slope R48 through point 91. The second control means re-establishes the nominal frequency at a second integral ratio at point 107 on slope R36 when the variation along slope R48 from the nominal frequency reaches the predetermined boundary 94.

Figure 4:
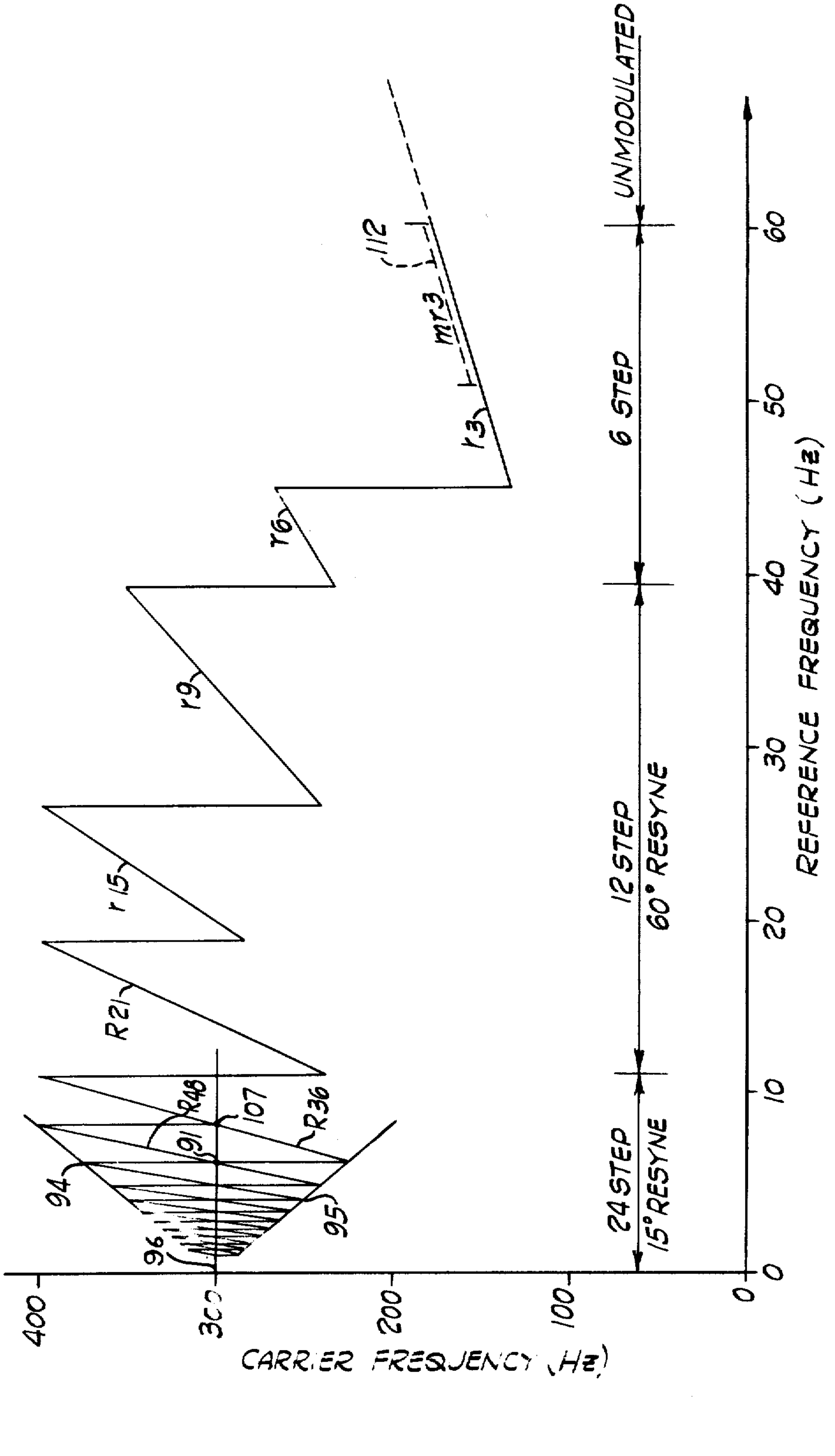
FIG. 4 is a graph of the carrier frequency as a function of reference frequency over the entire reference frequency range.

The third control means includes the multiple gain amplifier 22 to provide low ratios of carrier frequency to the reference frequency at high reference frequencies, above 10 Hz. in FIG. 4. The multiple gain amplifier 22 is discretely variable in gain to provide a change in input to the carrier generator 23. The gain of the multiple gain amplifier 22 is controlled by the modulation control circuit 27 through connector 41 in accordance with the amount of modulation of the reference wave form. The discrete gains of the multiple gain amplifier 22 establish the low integral ratios R21–R3 in FIG. 4 and predominates over the first and second control means at high reference frequencies above 10 Hz.

In the low reference frequency range on or about zero hertz, the first control means provides a free-running nominal carrier frequency to provide high ratios and smooth transition of the reference frequency through zero Hz. for four quadrant operation. In the intermediate frequency range above about ½ and below 10 Hz., the second control means maintains a given intermediate integral ratio and provides a substantially infinite number of intermediate integral ratios of carrier to reference frequency. In the high reference frequency range above 10 Hz., the third control means maintains discrete ratios of carrier to reference frequency and changes discrete ratios in accordance with the amount of modulation of the reference wave form by the carrier wave form.

Within the intermediate frequency range, a 24-step reference wave form is provided by the multiplexer 16 whereas a 12-step reference wave form is used between 10 and 40 Hz. Above 40 Hz., the multiplexer 16 provides six-step modulated and unmodulated reference wave forms with a transition wave form therebetween. This transition wave form occurs in a range 112 to reduce the large effective voltage change resulting from a change from a modulated to an unmodulated wave form. A suitable transition wave form is described in application Ser. No. 188,037, filed Oct. 12, 1971, and assigned to the assignee of this invention. Transitions between 24, 12, and six-step reference wave forms substantially change the effective voltage of the reference wave form. Accordingly, the modulation control circuit 27 varies the modulation level through connector 25 to comparator 24 to vary the carrier modulation to the multiplexer 16 to provide smooth transitions between 24, 12, and six-step operation.

Circuitry

Figure 5:
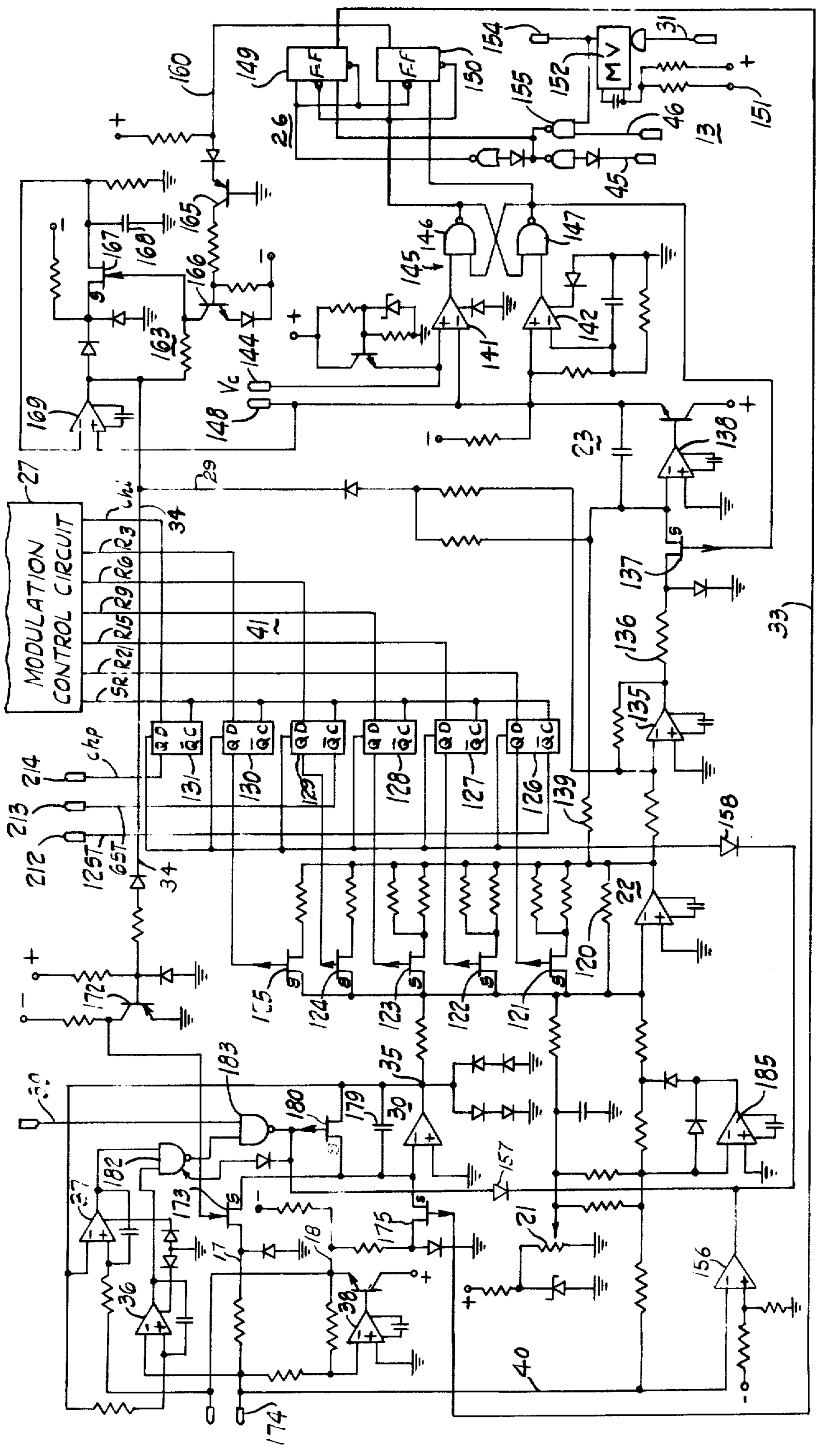
FIG. 5 is a schematic diagram of a portion of the circuit shown in FIG. 1.

FIG. 5 is a schematic diagram of a portion of the apparatus shown in FIG. 1, generally that contained in the blocks 13, 21, 22, 23, 26, 27, 30, 36, 37, and 38. The second source 21 applies a substantially constant DC voltage to the multiple gain amplifier 22 which has a plurality of discrete gain feedback paths which are activated by field effect transistors 121–125. Activation of the F.E.T.s 121–125 is accomplished by flip-flops 126-130 which are energized by the modulation control circuit 27 as shown by the connector 41 in FIG. 1. The output terminals, 12-step, six-step, and constant horsepower 212, 213, and 214 from flip-flops 126, 129, and 131, respectively, are connected to multiplexer 16 and the modulation control circuit 27 to control the number of steps of the reference wave form.

The output of the multiple gain amplifier 22 is connected through a unitity gain inverting amplifier 135, resistor 136, and F.E.T. 137 to the carrier generator 23 comprising a carrier integrator 138. The output of the multiple gain amplifier 22 is also applied by a resistor 139 to the carrier integrator 138. The value of resistor 139 is preferably twice that of resistor 136 to vary the gain of the carrier integrator 138 in accordance with the state of F.E.T. 137. The output of the carrier integrator 138 is applied to comparators 141 and 142 which compare the output of the carrier integrator 138 with a DC potential $V_c$ on terminal 144 and ground potential, respectively. When the integrator output equals either of these values, flip-flop 145 comprising Nand gates 146 and 147 changes state to change the state of F.E.T. 137 and the slope of the output of carrier integrator 138. The triangular carrier wave form shown in FIG. 2D appears at terminal 148 with the positive carrier slope appearing at the output of Nand gate 146 and the negative carrier slope appearing at the output of Nand gate 147. The output of Nand gates 146 and 147 are applied to flip-flops 149 and 150 which comprise a portion of the phase detector 26 in FIG. 1.

The output of the voltage to frequency converter 12 of FIG. 1 is applied through connector 31 to a one shot multivibrator 152 which comprises a portion of the delay circuit 13 of FIG. 1. Terminal 151 is connected to the first source 11 to vary the delay time ΔT in FIG. 2B in accordance with the level of the first source 11. The delayed output wave form 50 of FIG. 2B of the one shot multivibrator 152 is applied to the divider circuit 14 of FIG. 1 through terminal 154 and is also applied through Nand gate 155 to flip-flops 149 and 150 for 15° synchronization. The divider output 51 in FIG. 2C from the divider circuit 14 is applied by connector 45 for 60° synchronization. A signal from the modulation control circuit 27 through connector 46 to Nannd gate 155 determines whether 15° or 60° synchronization is applied to the flip-flops 149 and 150. The flip-flops 149 and 150 receive the outputs from Nand gates 146 and 147 and are controlled by either the divider output 51 or the delayed output 50 to provide correction pulses 72–75 to comprise the phase detector output 33 in FIG. 1 for a leading carrier wave form and to provide correction pulses 87 and 88 for a lagging carrier wave form. When the lagging correction pulse 87 is applied by connector 160 to a track and hold circuit 163, transistors 165 and 166 are activated to make F.E.T. 167 non-conducting.

The carrier wave form is applied to an amplifier 169 which is biased to negatively saturate during slope doubling operation. Since F.E.T. 167 is made non-conducting by the leading edge of correction pulse 87, capacitor 168 holds a charge proportional to the level 81 on the negative slope of wave form 52 in FIG. 2I. Capicitor 168 holds F.E.T. 167 non-conducting after the termination of pulse 87 until the positive slope 86B of wave form 52 obtains level 86 which is equal to level 81 to produce pulse 89 in FIG. 2L and the phase detector output 34 in FIG. 1. The track and hold circuit 163 modifies pulse 87 into pulse 89 to enable slope doubling on the positive slope 86B after the termination of pulse 87. The output 34 of the track and hold circuit 163 is connected by connector 29 to modify the input current of the carrier integrator 138 and thereby modify the carrier slope.

Frequency correction of the carrier integrator 138 for lagging carrier wave forms is accomplished by connecting the output 34 of amplifier 169 through transistor 172 to a field effect transistor 173. Connector 17 and F.E.T. 173, connects a terminal 174 connected to the first source 11, to charge integrator 30 in accordance with the level of the first source 11 and the duration of the phase detector output 34 comprising correction pulses 89 and 90 of FIG. 2L.

The leading phase detector output 33 is connected from flip-flop 149 to a field effect transistor 175. The inverting amplifier 38 inverts the level of the first source 11. The inverted level of amplifer 38 is connected by connector 18 and F.E.T. 175 to charge integrator 30 in accordance with the inverted first source level and the duration of conduction of field effect transistor 175. The level and the inverted level of the first source 11 establish the boundaries 94 and 95 of FIG. 3. Comparators 36 and 37 compare those levels with the integrator output 35 which comparators 36 and 37 are connected through Nand gates 182 and 183 to a field effect transistor 180. The F.E.T. 180 is made conducting by an output from one of the comparators 36 and 37 to discharge capacitor 179 to establish a new integral ratio of carrier to reference frequency. Connector 39 to Nand gate 183 from the divider circuit 14 insures that the integrator 30 is reset only in the proper phase relative to the reference wave form.

The terminal 174 from the first source 11 is connected to the multiple gain amplifier 22 through connector 40 and amplifier 185 to override the first and second control means when the level of the first source 11 exceeds the level of the second source 21. Comparator 156 compares the level at terminal 174 to a reference input to discharge capacitor 179 by F.E.T. 180 through diode 157 and to reset flip-flops 126–131 through diode 158.

Figure 6:
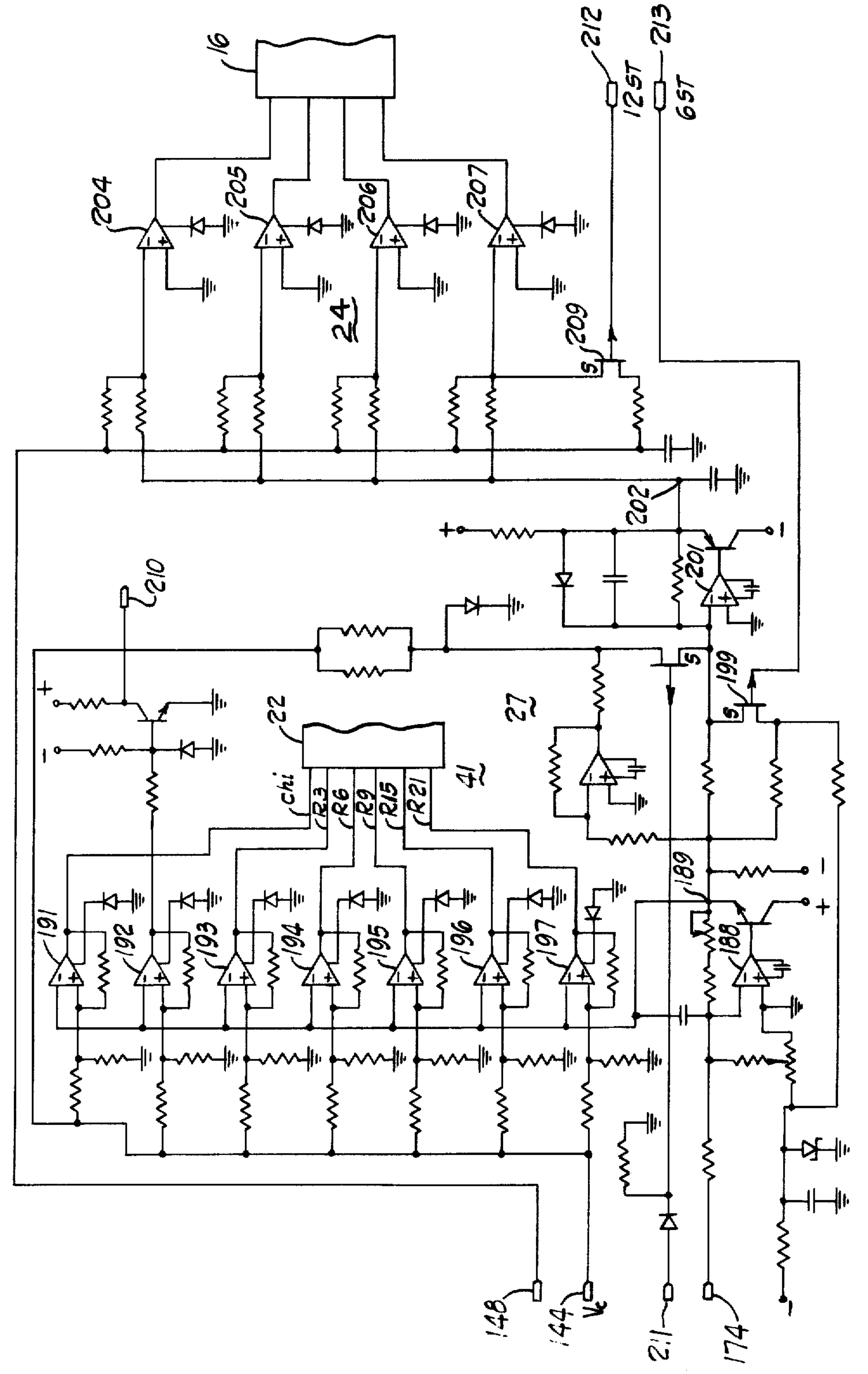
FIG. 6 is a schematic diagram of a portion of the circuit shown in FIG. 1.

FIG. 6 is a schematic diagram showing a portion of the modulation control circuit 27 and the comparator circuit 24 of FIG. 1. The level of the first source 11 is supplied through terminal 174 to amplifier 188. The output 189 of amplifier 188 is proportional to the degree of modulation of the reference wave form by the carrier wave form. The voltage $V_r$ from terminal 144 generated in FIG. 5 is applied to comparators 191–197. The input circuits interconnecting comparators 191–197 with terminal 144 are established to provide various levels to the positive inputs of comparators 191–197. The output 189 of amplifier 188 is applied to the negative input of comparators 191–197 to provide the output signals Chi, R3, R6, R9, R15, and R21 to change the gain of the multiple gain amplifier 22 in accordance with the degree of modulation. The Chi signal provides a signal to flip-flop 131 of FIG. 1 for an unmodulated six-step wave form.

The level of the first source 11 at terminal 174 provides an input to an amplifier 201 which amplifier provides an output 202 connected to comparators 204–207. The carrier wave form generated in FIG. 5 is applied through the terminal 148 to comparators 204–207. Comparators 204–207 provide an output in accordance with the relative level of the carrier wave form and output 202 to provide a modulation signal for pulse width modulation to the multiplexer 16. Pulse width modulation is obtained by comparing the level 202 shown for example in FIG. 2I with the amplitude of the carrier wave form. When the carrier wave form is greater in amplitude than the output 202, an output is applied by comparators 204–207 to the multiplexer 16 to modulate the reference wave form. If an increase in reference frequency is desired, the first source level will be increased thereby changing the level of output 202 relative to the amplitude of the carrier wave form to change the amount of modulation of the reference wave form. Due to a difference in fundamental voltage value between 24-, 12-, and six-step reference wave forms, discrete level changes in the output 202 are required for smooth transitions between 24, 12, and six-step reference wave forms. For example, an output from comparator 194 activates flip flop 129 in FIG. 5 to provide a signal in the six-step connector 213 to activate field effect transistor 199. Consequently, a constant current is applied to amplifier 201 to modify the output 202 to comparators 204–207 to provide a change in modulation to the multiplexer 16. Similarly an output from comparator 197 will activate flip flop 126 of FIG. 5 to provide a signal through the 12-step connector 212 to FET 209 to modify the input level to comparator 207. An output from comparator 192 provides a signal on terminal 210 which is applied to the ring counter circuit 15 which provides a signal upon terminal 211 to modify the input to amplifier 201 for the transition wave form occurring in the range 112 of FIG. 4.

The circuit described in FIGS. 1–6 provides many novel features which includes three classes. The first class includes an apparatus for synchronizing first and second wave forms to have a given frequency relation which comprises circuit blocks 11–15 for establishing the first wave form and circuit blocks 21–23 for establishing the second wave form. Detector means 26 determines any difference from a given frequency relation between the first and second wave forms. The output of the detector means 26 is connected to storing means shown in the preferred embodiment as integrator 30. The storing means may be any type of electronic device for holding the output signal of the detector means 26. The integrator 30 stores a correction signal in accordance with the output of the detector means 26. The correction signal is continuously applied to the carrier generator for synchronizing the first and second wave forms at the given frequency relation.

The second class includes an apparatus for synchronizing the first and second wave form comprising first circuit including blocks 11–15 for establishing a variable frequency first wave form and a second circuit including blocks 21–23 for establishing the second wave form at a nominal frequency. The nominal frequency is established to provide a first integral ratio of the nominal frequency to a given first wave form frequency. Means shown as phase detector 26 and integrator 30 vary the frequency of the second wave form in accordance with the first wave form to maintain the first integral ratio. Ratio change means including comparators 36 and 37 resets integrator 30 for establishing a second integral ratio of the second wave form frequency to the first wave form frequency when the variation of the second wave form frequency reaches the predetermined boundary established by the first source 11.

A third class includes an apparatus for multiple control of a first and second wave form which includes a circuit for establishing the variable frequency for first wave forms shown by blocks 11–15. Carrier generator 23 establishes the second wave form. First control means includes a second source 21 for providing a free-running second wave form at low first wave form frequencies. The apparatus includes means for synchronizing the first and second wave forms in a substantial number of integral frequency ratios at frequencies above said low first wave form frequencies.

The present disclosure includes that containeed in the apended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. An apparatus for synchronizing a first wave form and a second wave form to have a given frequency and phase relation, comprising in combination:

a circuit for establishing the first wave form;

a circuit for establishing the second wave form;

detector means for providing an output of the difference from the given frequency relation of the first and second wave forms;

phase modifying means connected between said detector means and one of said circuits for modifying the phase of the second wave form to synchronize the first and second wave forms at the given phase relation;

integrator means connected to said detector means for storing a correction signal in accordance with said output of said detector means;

and means for applying said correction signal to one of said circuits for modifying the frequency of said second wave form to synchronize the first and second wave forms at the given frequency relation.

2. An apparatus as set forth in claim 1, wherein said phase modifying means includes means for modifying the slope of said second wave form.

3. An apparatus as set forth in claim 2, wherein said phase modifying means includes means for modifying positive and negative wave form slopes.

4. An apparatus as set forth in claim 1, wherein said detector means includes;

means for determining a synchronizing point of the second wave form;

and means for indicating a phase difference between said synchronizing point and the first wave form.

5. An apparatus for synchronizing a reference wave form and a carrier wave form to have a given phase and frequency relation, comprising in combination:

a converter for establishing a converter wave form;

a reference wave form circuit connected to said converter establishing the reference wave form at a frequency related to the frequency of said converter wave form;

a carrier generator for generating the carrier wave form;

means for determining a synchronizing point of the carrier wave form;

phase detector means for providing a phase output to indicate the phase difference between said synchronizing point and said converter wave form;

slope modifying means connecting said phase detector means to said carrier generator for modifying the slope of said carrier wave form for synchronizing the reference and carrier wave forms at the given phase relation;

integrator means connected to said phase detector means for storing a correction signal in accordance with the phase output of said phase detector means;

and means connecting said integrator means for continuously applying said correction signal to said carrier generator for modifying the frequency of the carrier wave form to synchronize the carrier wave form with the reference wave form at a given frequency relation.

6. An apparatus as set forth in claim 5, wherein said continuous correction signal establishes a zero phase error synchronization between said carrier and reference wave forms.

7. An apparatus as set forth in claim 5, wherein said phase detector means includes means for providing a first phase output for indicating a lagging carrier wave form and a second phase output for indicating a leading carrier wave form with respect to said given frequency relationship of said carrier wave form and the reference wave form;

and wherein said slope modifying means is connected to said first phase output to phase resynchronize a lagging carrier wave form.

8. An apparatus as set forth in claim 5, including means for varying the frequency of said converter.

9. An apparatus as set forth in claim 8, wherein said phase detector and said integrator means vary the frequency of the carrier wave form in accordance with changes in the frequency of said converter wave form to maintain the given relationship between said converter wave form and the carrier wave form.

10. An apparatus as set forth in claim 5, including means for changing the given frequency relationship of said converter wave form and the carrier wave form.

11. An apparatus as set forth in claim 5, wherein said given frequency relationship includes;

one of said converter and carrier wave forms being a multiple of the other of said converter and carrier wave forms.

12. An inverter apparatus for phase locking a reference wave form and a carrier wave form to control thyristor means, comprising in combination:

a variable level reference source;

a converter connected to said reference source for developing a converter wave form having a frequency determined by said level of said reference source;

a time delay circuit connected to said converter for providing a delayed wave form which is delayed in time relative to said converter wave form;

a divider circuit connected to said time delay circuit for establishing the reference wave form having a frequency which is related to the frequency of said delayed wave form;

a carrier generator for generating the carrier wave form having a frequency determined by an input level to an input of said carrier generator;

means for applying an input level to said carrier generator input to establish the frequency of the carrier wave form to be related to said converter wave form frequency;

detector means connected to said carrier generator and said time delay circuit to provide a first detector output for indicating a lagging carrier wave form relative to said delayed wave form and to provide a second detector output for indicating a leading carrier wave form relative to said delayed wave form;

slope modifier means connected to said carrier generator for modifying the slope of said carrier wave form;

means for connecting said detector means to said slope modifier means for modifying the slope of the carrier wave form in accordance with said first detector output to phase resynchronize lagging carrier wave form;

integrator means connected to said detector means for storing a correction signal in accordance with said first and second detector outputs;

and means connecting said integrator means to said carrier generator for modifying the frequency of the carrier wave form in accordance with said correction signal to frequency resynchronize leading and lagging carrier wave forms and to establish a zero phase error synchronization of the carrier wave form relative to the reference wave form.

* * * * *